United States Patent [19]
Krahe et al.

[11] Patent Number: 5,608,542
[45] Date of Patent: Mar. 4, 1997

[54] FORMATTED DIGITAL INDEX PRINT SYSTEM AND METHOD

[75] Inventors: Michael D. Krahe, Brockport; Rocco J. Porcellio, Fairport; David P. D'aurelio, Hilton, all of N.Y.

[73] Assignee: Eastman Kodak Company, Rochester, N.Y.

[21] Appl. No.: 415,104

[22] Filed: Mar. 31, 1995

[51] Int. Cl.⁶ .......................... H04N 1/387; H04N 1/393
[52] U.S. Cl. .......................... 358/449; 358/450; 358/487
[58] Field of Search .................................... 358/487, 450, 358/449, 506, 527

[56] References Cited

U.S. PATENT DOCUMENTS

| | | |
|---|---|---|
| 4,174,174 | 11/1979 | Hunter, Jr. et al. . |
| 4,682,286 | 7/1987 | Yamada . |
| 4,805,039 | 2/1989 | Otake et al. . |
| 4,903,068 | 2/1990 | Shiota . |
| 4,920,423 | 4/1990 | Shiota . |
| 4,933,773 | 6/1990 | Shiota et al. . |
| 4,935,809 | 6/1990 | Hayashi et al. . |
| 4,965,662 | 10/1990 | Shiota . |
| 4,966,285 | 10/1990 | Otake et al. . |
| 5,068,742 | 11/1991 | Oshikoshi et al. . |
| 5,184,227 | 2/1993 | Foley . |
| 5,237,156 | 8/1993 | Konishi et al. . |

Primary Examiner—Scott A. Rogers
Attorney, Agent, or Firm—Francis H. Boos, Jr.

[57] ABSTRACT

Customized index prints incorporating user determined graphical representations and optional textual information is generated from user selectable digital index print description files having template data and bit-mapped graphical representations. Digital image data is provided from a film scanner along with frame number information and is resized using size instructions from the index print description file to fit the imagette areas in the index print template. Optional textual data is entered via a user interface to provide customized information to the customer. The processed imagette data and bit-mapped graphical representations (and optional textual information) is then merged into the index print template data to create a printable customized index print template file which can be sent directly to a digital printer or stored for subsequent off-line printing.

7 Claims, 5 Drawing Sheets 5,608,542

FORMATTED DIGITAL INDEX PRINT SYSTEM AND METHOD

FIELD OF THE INVENTION

The invention relates generally to the field of photography, and in particular to apparatus and method for producing index prints from film images.

BACKGROUND OF THE INVENTION

An index print is a matrix of small imagettes, reproduced from individual film image frames, usually with frame numbers to associate the imagettes with the corresponding image frames on the film. Typically, the index print is produced by the photofinisher when the original print order is processed and is supplied to the customer as a convenient means of identifying image frames on the film. This is a particular advantage in the case of negative films which are difficult for the average user to discern. An example of an index print is shown in FIG. 1.

Apparatus and methods for producing index prints may be found in the art as represented by U.S. Pat. Nos. 4,903,068; 4,920,423; 4,933,773; and 5,184,227. A problem with systems of the type disclosed therein is that the format of the resulting index print is fixed and does not allow for customization by the photofinisher. In general, prior art index prints include the imagettes, a frame number to associate the imagette with the location of the image frame on the film and minimal amount graphics fixed in the index print software supplied to the photofinisher.

It is desirable therefore to provide apparatus and method for creating customized index print formats that allow the photofinisher to create and print unique photofinisher identification on the index print, formatting specific to each imagette in the index print as well as customer specific information for the index print.

SUMMARY OF THE INVENTION

In accordance with one aspect of the invention, therefore, there is provided an image printing system for creating formatted index prints which comprises a film scanner for generating digital image data from photographic film images and digital non-image data representative of characteristics of the film images; and storage means for supplying encoded instruction data descriptive of a predetermined index print template including data representative of image size in the index print and bit-mapped data corresponding to graphical representations to be incorporated into the formatted index print. The system also includes image processing means for modifying characteristics of the digital image prior to incorporation in the formatted index print; decoder means responsive to index print template instructions from said storage means to convert into bit mapped template data and to said non-image data from said film scanner for resizing said image data to fit the image size as described in the template data; and index print rendering means for merging said modified image data and said bit-mapped graphical representation data into said index print template to create said formatted index print.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In its broadest aspect, the invention comprises a fully featured system and method for performing the complete function of scanning a series of film images to generate digitized imagette data and producing the customized index print from the digitized imagette data.

Figure 1:
FIG. 1 is an illustration of an index print.
Figure 1:
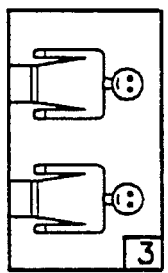
Figure 1:
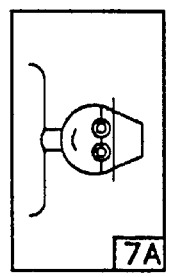
Figure 1:
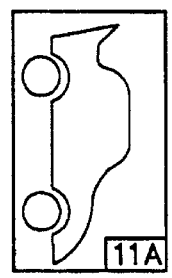
Figure 1:
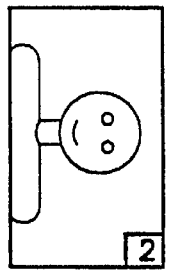
Figure 1:
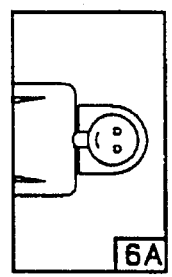
Figure 1:
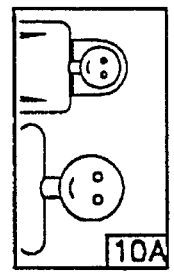
Figure 1:
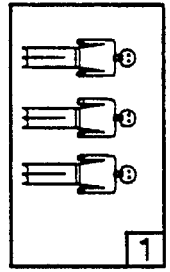
Figure 1:
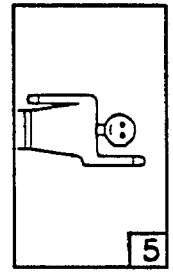
Figure 1:
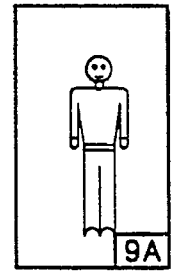
Figure 1:
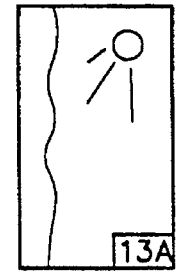
Figure 1:
Figure 1:
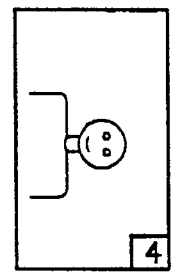
Figure 1:
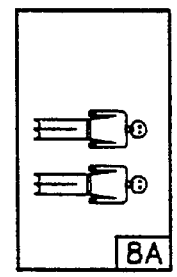
Figure 1:
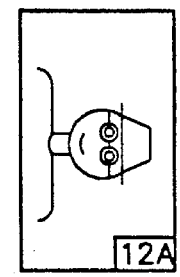
Figure 2:
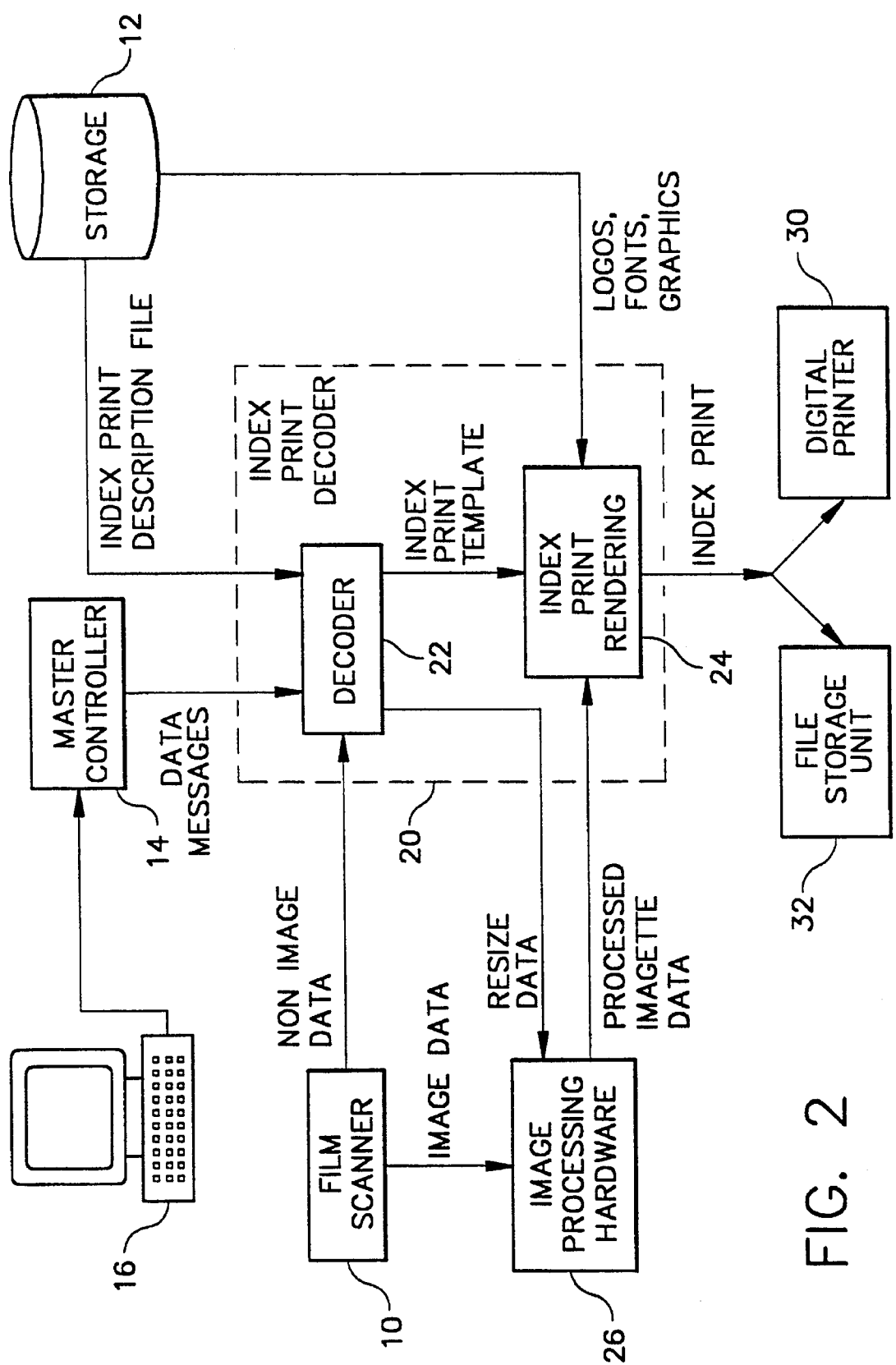
FIG. 2 is a schematic block diagram of an index print generating system in accordance with the invention.

As shown in FIG. 2, the system includes a film scanner 10 for generating both digital image data from each of a series of images on photographic film and digital non-image data representative of characteristics of the film images. Non-image data may, for example, comprise frame identification numbers derived either from barcoded data optically recorded n the film or digital data recorded on a magnetic layer formed on the film.

The system also includes storage means 12 for storing and supplying user selectable index print description files. In the presently preferred form of the invention, an index print description file takes the form of an ASCII digital file comprised of encoded instruction data descriptive of a predetermined index print template which defines the layout of the index print, particularly the size, orientation and location of the imagettes, and of any other objects such as logos, graphical representations and text messages. The bit-mapped graphical representation data may be stored and supplied separately from the index print description file. However, the preferred form, the graphical representation data is embodied in index print description file. A variety of different index print description files are stored in storage means 12 and a desired file is selected by the system user via instructions from a master controller 14 based on instructions entered by the user. Embedded within each encoded description file are instruction data for setting the imagette size to be employed in the index print template corresponding to that file. In addition to the template information, the storage means also stores and supplies bit-mapped objects consisting of predefined blocks of bit-mapped data corresponding to discrete graphical representations, such as logos and font information, to be incorporated into the resultant formatted index print. Storage means 12 may comprise a hard disc or floppy disc drive, a random access memory or other known type of digital data storage device. In addition to selection of the index print description file and objects from storage unit 12, user determined, customized textual messages to be incorporated into the index print are supplied from master controller 14.

The centralized master controller 14 is preferably a dedicated computer board serving as a focal point for interface with the system user and for control of the various pieces of equipment associated with the index print generation. For user interface, the controller may be coupled to a user operated workstation, such as a personal computer, to allow input of the user's selection of a desired template (index print description file) and any desired customized textual messages to be incorporated into the index print. The master controller also serves to control the operation of film scanner 10 and an image processor unit 26, as will be apparent from the ensuing description.

The system of the invention also includes an index print generator 20 and image processor unit 26. The index print generator 20 may take the form of a microcomputer based on, for example, a Motorola 162 family CPU board. Index print generator 20 is programmed to serve as a decoder means 22 and an index print rendering means 24, the operation of which is described below. Decoder means 22 receives the index print description file from storage 12 and is responsive to the encoded template instruction data therein for converting the instruction data into bit mapped template data which defines the index print format. This decoded bit map template data is sent to the index print rendering means 24 where it is employed in the index print building process. Decoder means 22 also extracts the image resizing data embedded in the index print description file and sends this data to image processor 26.

Figure 3:
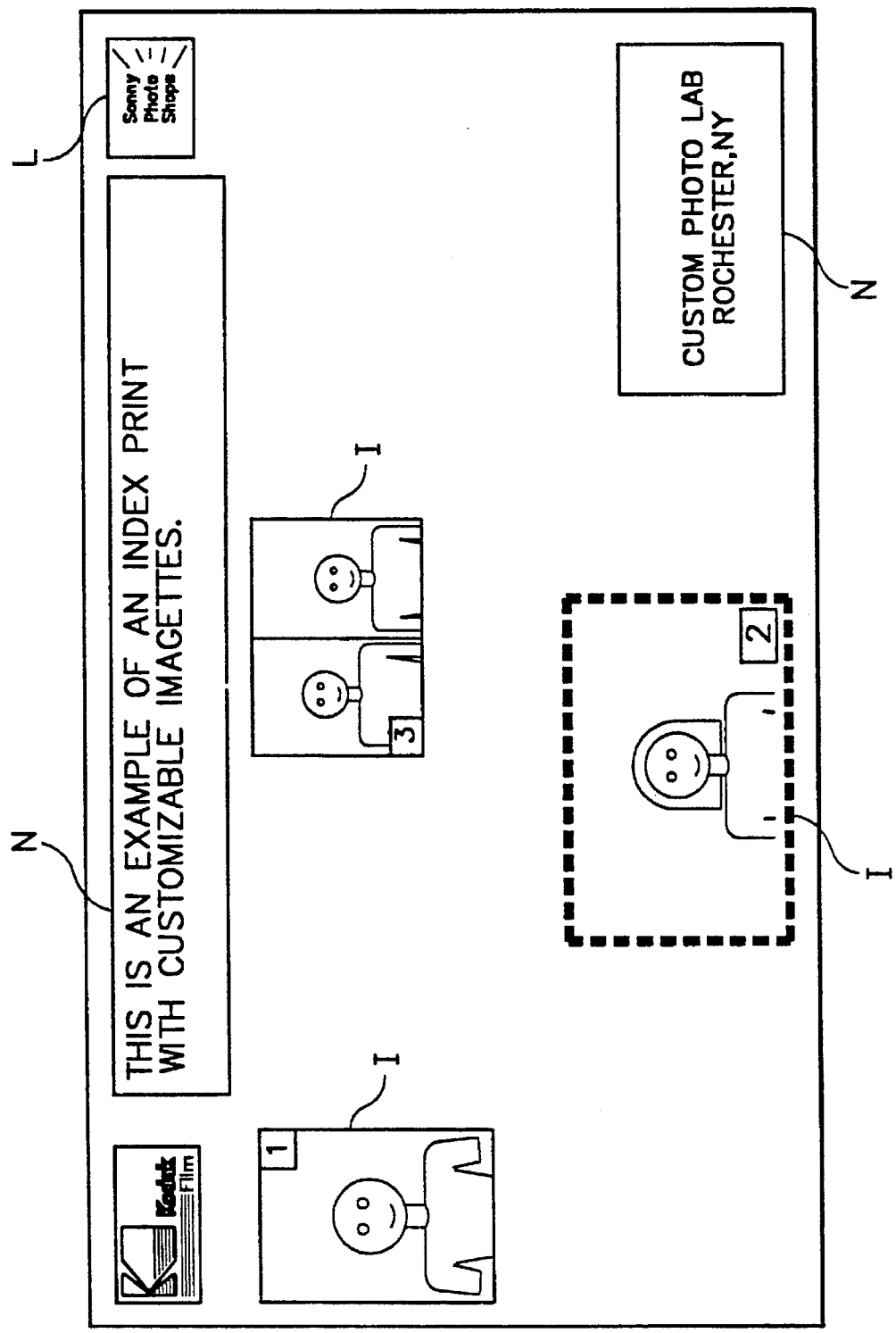
FIG. 3 is an illustration of a customized index print format created in accordance with the invention.

Image processor unit 26 may comprise any well known form of digital image processing hardware suitable for manipulating in known manner to provide such features as edge enhancement and color correction. Image processor 26 also responds to the imagette size data from decoder means 22 to resize the image data from scanner 10 to fit into the template selected by the user. The resized and processed imagette data is then sent to the index print rendering means 24 which combines the processed imagette data with the template data from decoder means 22. Bit mapped graphical representation data, such as logos and font information, is received directly from storage 12, bypassing decoder 22 since it is already in bit-map form, and is merged into the template in the print rendering means 24. The result is a user-customized, composite printable index print data file which is then employed to create a hard copy of the index print. The index print data file may be sent directly to a conventional digital printer 30 for on-line printing of the index print or to an intermediate file data storage unit 32, such as a floppy disc or computer hard drive, for subsequent off-line printing. An example of a customized index print produced by the present invention is shown in FIG. 3. In this customized index print an additional photofinisher logo L is inserted by the photofinisher. The notes block N can include information specific to the customer such as a descriptive title for the pictures on the film roll. Individualized borders for each imagette I, common orientation of landscape and protrait imagettes and selectable size and location of imagettes are also possible with the present invention as seen in FIG. 3.

Figure 4:
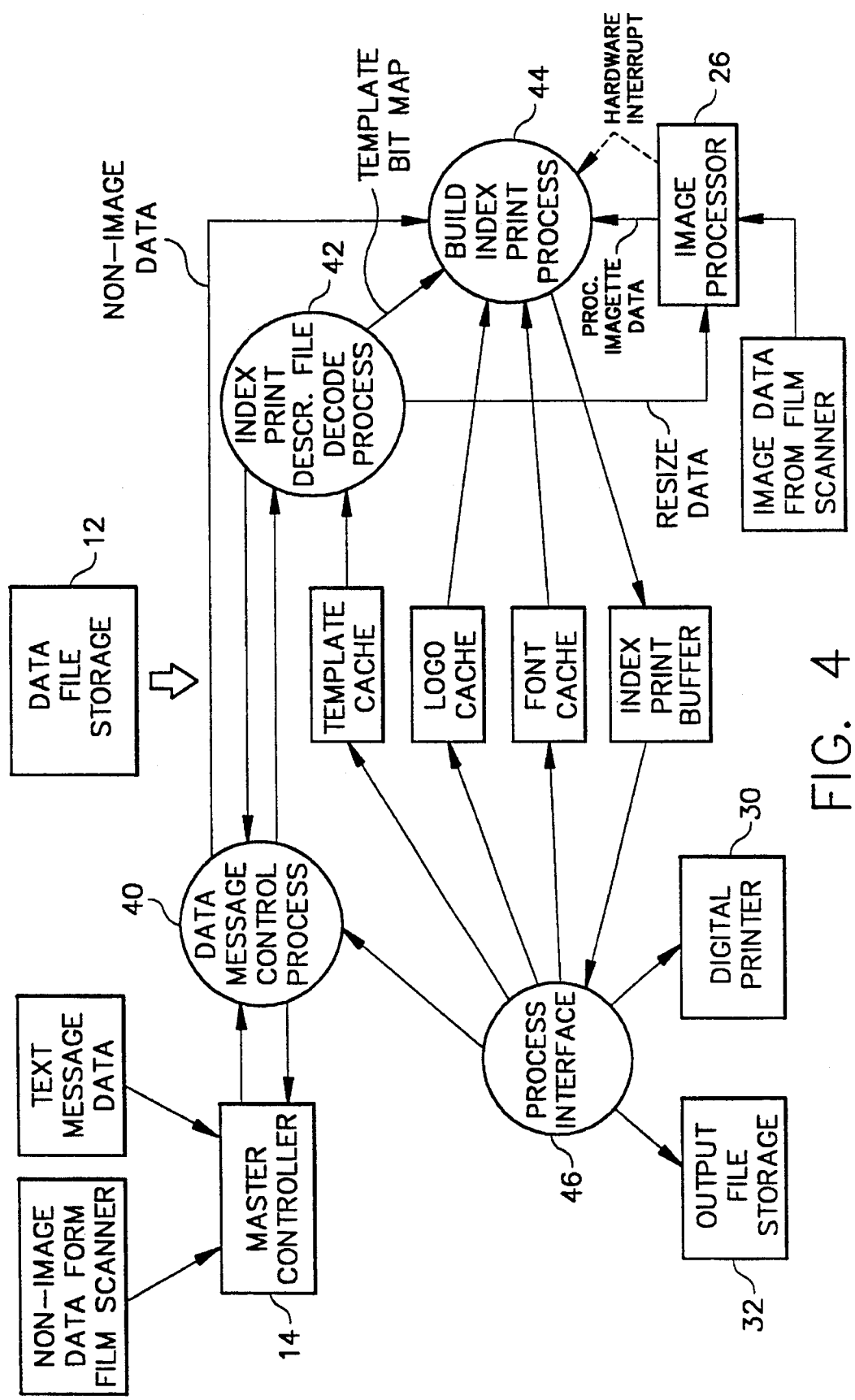
FIG. 4 is a software data flow diagram for the system of FIG. 2.

The manner in which index print generator 20 is programmed to generate the customized index print will now be considered with reference to FIG. 4 which shows a standardized software data flow diagram from which software programmers skilled in the art may create the necessary programs. Initially, data message control process 40 receives a data message from master controller 14 identifying the user-selected template to be used in making the index print and inputs the message to the decode index print description file process 42. If the template is not in RAM cache, it will be retrieved directly from storage 12. Then the system will wait for an order message from the master controller 14 indicating that an order is coming. Master controller causes film scanner 10 to initiate scanning and the scanned image data is sent to the image processor 26.

As the film scanning progresses, the decode index print description process 42 interprets the index print description file code and generates the index print template bit map which is stored for use in the build index print process 44. Additionally, the resize information embedded in the index print description file is sent to the image processor 26 (via the master controller 14). As imagettes are processed, an interrupt is sent to build index print process 44 indicating an imagette is ready to be read from the image processor. The imagette is placed in the index print template at the appropriate location and process 44 then waits for the next interrupt. The non-image data from the master controller 14 is sent directly to the build index print process 44 for insertion into the template bit map. Customized logo and font bit map information received into cache from storage unit 12 is added to the template bit map in the build index print process 44. As the index print is built up, it is stored in an index print buffer storage. When an end of order instruction is received from the master controller, the index print data is sent from the buffer to file storage 32 or index printer 30 via the process interface 46.

Figure 5:
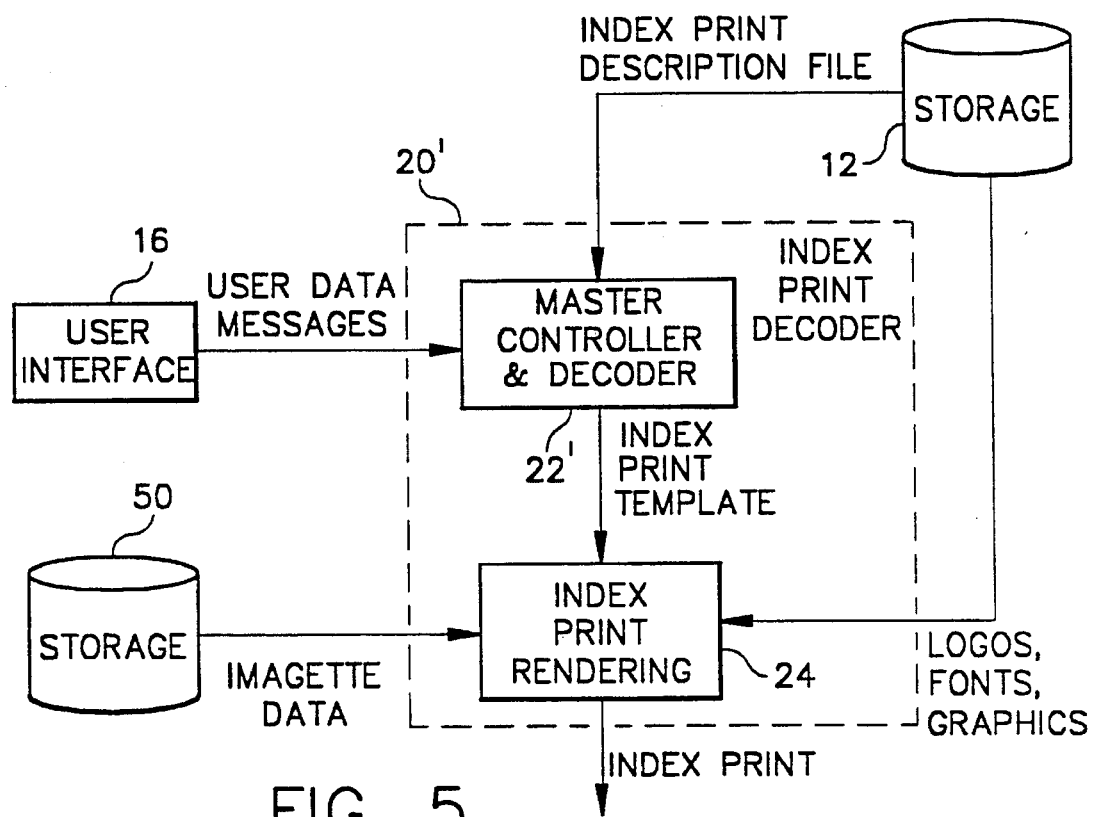
FIG. 5 is a schematic block diagram of a stand alone index print decoder system in accordance with another aspect of the invention.

The system of FIG. 2, as described above, is a complete system capable of working with film images as an input and, as such, is most appropriate for use by commercial photofinishing labs. A modification of the system that allows its use by a suitably programmed workstation to convert digitized image files directly into customized index prints is shown in FIG. 5. This embodiment differs from the broader system in that the master controller and index print description decoder are combined in unit 22' in a single workstation 20'. Image scanning has been done previously and the imagettes exist in named digital files received from storage unit 50 (e.g. disc drive). The names of the imagettes for a particular index print are contained within the index print description file as well as the non-image data which is placed there by the user when the description file is generated. This non-image data is associated with the imagette files by the name assigned to each imagette file. It is possible with this embodiment to provide custom imagette size data for each imagette file, allowing different sized imagettes to be printed on the same index print. The template data from storage unit 12 is decoded and the index print is built up within index print generator 20' in substantially the same manner as described for the system of FIG. 2.

Figure 6:
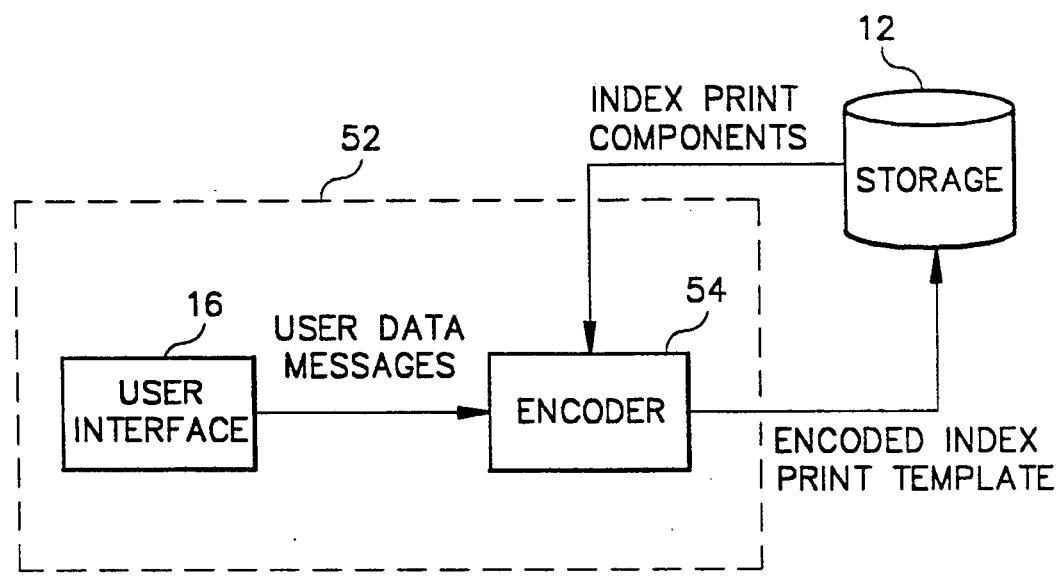
FIG. 6 is a schematic block diagram of a stand alone index print encoder in accordance with yet another aspect of the invention.

In FIG. 6, a subsystem is shown which is embodied in a workstation and uses a graphical or text based user interface to generate a customized index print description file. Essentially, the embodiment of FIG. 6 a software application running on a workstation 52, such as a personal computer. One or more master index print templates are stored on storage unit 12. The user selects a desired master template from storage and, using a menu of user-selectable graphical representations, selects the size of the index print and the location and sizes of objects (e.g. logos, imagettes), as well as other characteristics of the objects, for example, foreground and background colors, font styles, font sizes and colors, borders and the like. As each are selected and determined, they are encoded into a revised template file (index print description file) to thereby customize the template to the desires of the user. When completed, the encoded template file is then placed in storage 12 for subsequent use in creating index prints as described above.

The invention has been described with reference to a preferred embodiment. However, it will be appreciated that variations and modifications can be effected by a person of ordinary skill in the art without departing from the scope of the invention.

PARTS LIST 10 film scanner
12 data storage and supply device
14 master controller
20 index print generator
22 decoder means
24 index print rendering means
26 image processor
30 index print printer
32 file storage unit
40 data message control process
42 index print description file decode process
44 build index print process
50 storage unit
52 encoder workstation

What is claimed is:

1. An image printing system-for creating customized formatted index prints comprising:

a film scanner for generating digital image data from photographic film images and digital non-image data representative of characteristics of the film images;

storage means for storing a plurality of user-selectable index print description files each of which comprises encoded instruction data descriptive of predetermined index print templates, the instruction including data representative of imagette size in the corresponding index print template, the storage means also storing bit-mapped data corresponding to graphical representations to be incorporated into the formatted index print;

means including a user interface for selecting one of said index print description files and selected ones of said graphical representations;

decoder means responsive to the selected encoded instruction data from said storage means for converting said instruction data into bit-mapped template data and imagette size data;

image processing means responsive to said digital image data and said imagette size data for generating processed imagette data by modifying characteristics of the digital image data and resizing said digital image data to fit an image size required by the template data; and index print rendering means for merging said processed imagette data and said bit-mapped graphical representation data into said index print template to create said customized, formatted index print.

2. The system of claim 1 in which said bit-mapped data corresponding to graphical representations is embodied in the index print description file.

3. A system for creating a formatted index print comprising:

means for supplying digital image data;
means for supplying data corresponding to bit-mapped graphical representations;
means for supplying instruction data corresponding to a user-selected index print template;

decoder means responsive to said index print template instruction data to convert said instruction data into bit mapped template data;

means for setting image data size for each image to an appropriate size for merger into said template; and index print rendering means for merging said sized image data and said bit-mapped graphical representation data into said index print template to create said formatted index print.

4. A method of creating an index print template description file in a digital data workstation comprising the steps of:

selecting the size of an index print to be generated;

providing digital data representing a master index print template to be customized by a user;

providing a menu of user-selectable digital data representing graphical representations to be incorporated in the index print;

selecting desired ones of said graphical representation digital data and determining the locations thereof on said master template; and determining and setting size and locations of user selected images on the master template.

5. A method of generating customized, formatted index prints comprising:

providing a plurality of different encoded index print description files each descriptive of a predetermined index print template having imagette areas and a plurality of different graphical areas, the encoded file including data representative of size of the imagette;

providing user selectable bit-mapped data corresponding to graphical representations to be incorporated into the graphical areas of the index print template;

selecting one of said plurality of index print description files and desired ones of said bit-mapped graphical representations;

decoding said selected index print description file to create bit-mapped template data representing the layout of the formatted index print providing digital image data representative of image frames scanned from photographic film to be reproduced as imagettes for insertion into the imagette areas of the index print template and providing digital non-image data representative of characteristics of the image frames including location of the image frames on the film;

processing said digital image data to modify characteristics of the digital image data, including image size, to generate processed imagette data; and merging said processed imagette data and said graphical representation data into the bit mapped index print template data to thereby create a printable, customized, formatted index print data file.

6. The method of claim 4 wherein said graphical representation data are incorporated into the index print description file and are selected along with selection of the index print description file.

7. The method of claim 5 further including entering user determined textual data and merging said textual data into the index print template data.

* * * * *